United States Patent [19]
Voss et al.

[11] Patent Number: 5,082,549
[45] Date of Patent: * Jan. 21, 1992

[54] MEMBRANE STACK UNIT FOR MULTICHAMBER PROCESSES

[75] Inventors: Hartwig Voss, Lauenburg; Klemens Kneifel, Geesthacht; Uwe Martens, Hohnsdorf, all of Fed. Rep. of Germany

[73] Assignee: Forschungszentrum Geesthacht GmbH, Geesthacht, Fed. Rep. of Germany

[*] Notice: The portion of the term of this patent subsequent to Feb. 5, 2008 has been disclaimed.

[21] Appl. No.: 618,995

[22] Filed: Nov. 28, 1990

Related U.S. Application Data

[60] Division of Ser. No. 488,505, Mar. 5, 1990, which is a continuation of Ser. No. 339,941, Apr. 17, 1989, which is a continuation of Ser. No. 498,571, May 26, 1983.

[30] Foreign Application Priority Data

May 27, 1982 [DE] Fed. Rep. of Germany ....... 3219869
Feb. 5, 1983 [DE] Fed. Rep. of Germany ....... 3303910

[51] Int. Cl.$^5$ .............................................. B01D 13/02
[52] U.S. Cl. .................................. 204/301; 204/182.4
[58] Field of Search .................. 204/301, 182.3, 182.4; 210/321.7

[56] References Cited

U.S. PATENT DOCUMENTS 4,303,493 12/1981 Kneifel et al. ...................... 204/301
4,990,230 2/1991 Voss et al. .......................... 204/301

Primary Examiner—John Niebling
Assistant Examiner—Arun S. Phasge
Attorney, Agent, or Firm—Spencer & Frank

[57] ABSTRACT

A membrane stack unit for performing a multichamber treatment of plural component fluids, composed of a plurality of sealing frames, membranes interposed between the frames, and two end plates with milegrated electrodes disposed at respective opposite ends of the unit with the frames and membranes interposed therebetween. Each frame has four side edges enclosing a region constituting a treatment chamber, with one pair of opposed side edges being provided with a set of through bores for conducting fluid, a set of second bores, and inlet and discharge channels each communicating with a respective second bore and with the chamber, and the second pair of opposed side edges being provided with through bores for conducting fluid. Each membrane is provided with openings aligned with all of the bores. The sealing frames are oriented relative to one another such that at least some of the through bores in one frame are aligned with respective ones of the second bores of another frame. Each end plate is provided with a plurality of bores forming flow paths with selected ones of the bores in the sealing frames, and a plurality of fluid flow channels communicating with the bores in that end plate, and a plurality of bores and two collecting channels for the entrance and discharge of the electrode rinse solution.

9 Claims, 6 Drawing Sheets

MEMBRANE STACK UNIT FOR MULTICHAMBER PROCESSES

This is a division of application Ser. No. 07/488,505 filed Mar. 5th, 1990, which is a continuation of application Ser. No. 07/339,941 filed Apr. 17th, 1989, which is a continuation of application Ser. No. 06/498,571 filed May 26th, 1983.

BACKGROUND OF THE INVENTION

The present invention relates to a membrane stack unit for multichamber processes, the unit being of the type including sealing frames, end plates and membranes provided at oppositely disposed sides of the sealing frame to define chambers. Corresponding supply and connecting bores for solutions to be treated are in communication with the interior of the chambers along the sealing frame, alternatingly via inlet and outlet channels. The invention further relates to uses of such a unit.

The principle of electrodialysis, the configuration of a membrane stack for desalinating a sodium chloride solution by means of two streams of solute, and the basic design for a sealing frame are disclosed in DE-AS [Published Application] 2,902,247. However, with this proposed design of the membrane stack it is impossible to operate multicircuit processes for the purpose of recovering substances from solutions and waste waters under economical conditions or to recycle such substances or separate environmentally harmful substances, since it does not provide for the intake and discharge of more than two solute streams and does not make such provision possible with simple means.

Laboratory apparatus is also known in which the chambers are supplied individually. However, these chambers have a thickness of 5 mm, which would lead to considerable dimensions of the membrane stack if the number of chambers is increased and to difficulties in the application of joint intake and discharge conduits.

If up to four separate streams are required to perform certain tasks, it is possible, in some cases, to implement the process in two successive steps with two series connected conventional membrane stacks, but the added costs are considerable due to greater expenditures for apparatus and increased energy consumption.

SUMMARY OF THE INVENTION

It is an object of the present invention to provide a membrane stack unit of the above type which is so constructed that it can be used for separating and possibly converting a plurality of components in a solution in one process step, i.e. so that it can be used also for purposes other than electrolysis.

The above and other objects are achieved, according to the invention, by the provision of a membrane stack unit for performing a multichamber treatment of plural component fluids, comprising: a plurality of sealing frames, membranes interposed between the frames, and two end plates with integrated electrodes disposed at respective opposite ends of the unit with the frames and membranes interposed therebetween; each frame having four side edges enclosing a region constituting a treatment chamber, with one pair of opposed side edges being provided with a set of through bores for conducting fluid, a set of second bores, and inlet and discharge channels each communicating with a respective second bore and with the chamber, and the second pair of opposed side edges being provided with through bores for conducting fluid; each membrane being provided with openings aligned with all of the bores; the sealing frames being oriented relative to one another such that at least some of the through bores in one frame are aligned with respective ones of the second bores of another frame; and each end plate is provided with a plurality of bores forming flow paths with selected ones of the bores in the sealing frames, and a plurality of fluid flow channels communicating with the bores in the end plate.

One of the most significant advantages of the present invention is that with a single type of sealing and deflection frame and end plate it is possible to assemble membrane stacks so as to be able to perform separating and conversion tasks which require up to four independent solute streams. The membrane stacks can be assembled in serial repetition. Thus it becomes possible, inter alia, to separate environmentally harmful substances from solutions encountered, for example, in the treatment of metal surfaces and in chemical processes.

Thus, the present invention makes it possible to separate and possible convert in one process step a plurality of components which are dissolved in water in that up to four different liquid streams can be handled by one membrane stack with the streams being separated by suitable combinations of membranes, including cation exchanger membranes, anion exchanger membranes and neutral membranes, adapted to the particular process. The transport of substances through the membranes may be effected by electrical transfer and diffusion or dialysis, simultaneously or individually. For this purpose, special sealing frames, end plates and deflection concepts to extend the process path have been developed.

This invention will now be explained in greater detail with reference to embodiments of the membrane stack unit and its use illustrated in the drawing Figures.

DESCRIPTION OF THE PREFERRED EMBODIMENTS

Figure 1:
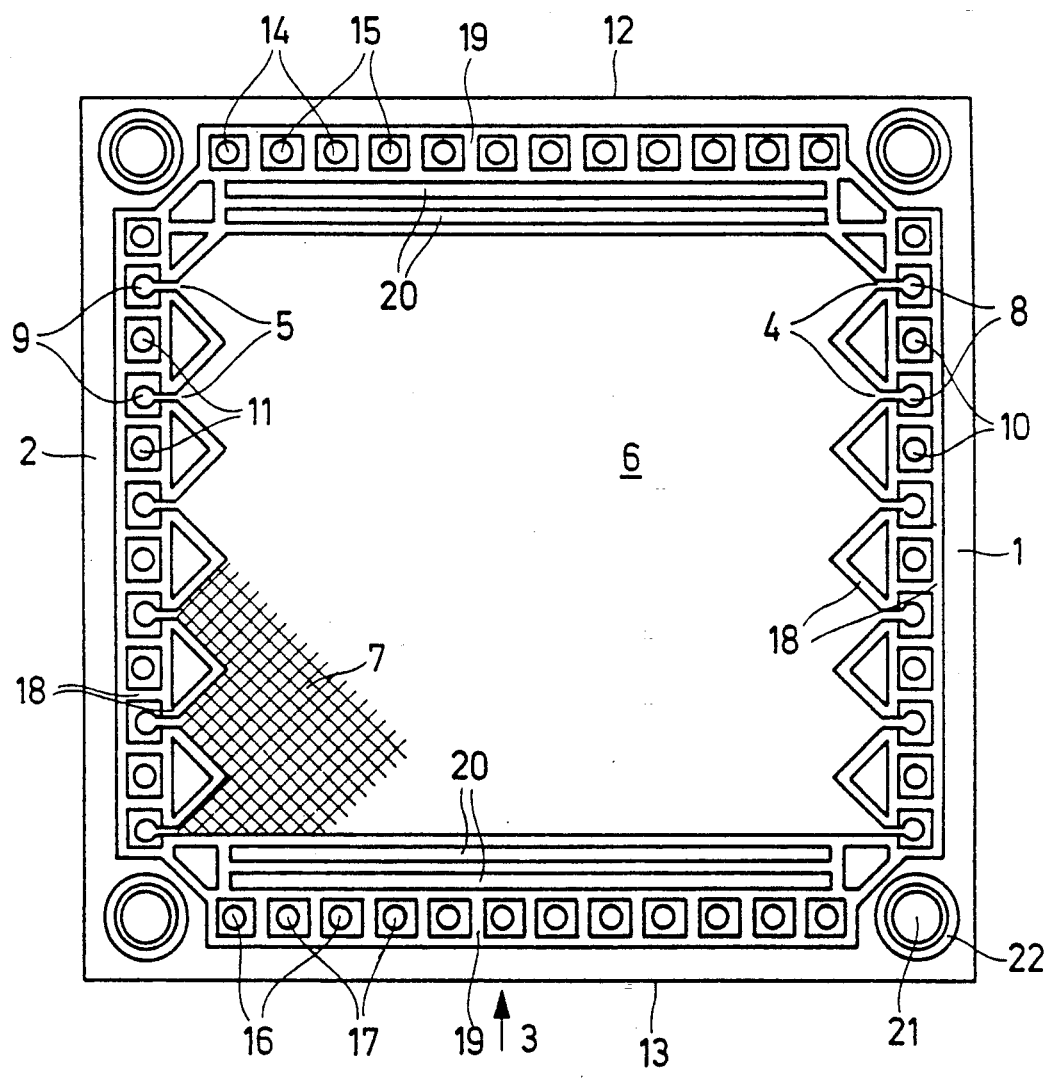
FIG. 1 is a top plan view of a sealing frame for a chamber of a stack unit according to a first preferred embodiment of the invention.

The uniform sealing frames employed in the practice of the present invention are based on the basic concept disclosed in DE-AS 2,902,247. FIG. 1 shows a square sealing frame 3 at whose oppositely disposed side edges 1 and 2 there are provided a plurality of slits 4 and 5, respectively, via which solute is supplied to, and discharged from, chamber 6 enclosed by sealing frame 3. Slits 4 and 5 are disposed opposite one another and are disposed at side edges 1 and 2, respectively.

The slits 4 and 5 are positioned asymmetrically relative to the other two side edges 12 and 13. Thus while one slit 4 and one slit 5 are disposed directly adjacent edge 13, the slits 4, 5 closest to edge 12 are spaced therefrom by a distance equal to one-half the distance between two adjacent slits. Therefore if one frame 3 is rotated by 180° relative to another frame 3, the slits 4 and bores 8 in one frame are aligned with bores 11 in the other frame. Such relations exist in the arrangements of FIGS. 2 and 7.

Slits 4 and 5 lead as relatively narrow channels into the interior of edges 1 and 2 of the sealing frame 3 and diverge in the other direction with an opening angle of 90° so that a zigzag configuration of the chamber outline results along each of side edges 1 and 2. The chamber 6 is provided with an inserted net-like fabric 7 to serve as spacer for the membranes to be applied on both sides of the frame.

Slits 4 and 5 are in communication with supply and connection bores 8 and 9, respectively. These bores pass through the sealing frame 3 and correspond with bores in the membranes and in the end plates. In addition to bores 8 and 9, further alternating supply and connecting bores 10 and 11 are provided. Bores 10 and 11 traverse the side edges 1 and 2 as through bores which do not communicate with chamber 6 but which can be connected with another chamber.

The other two side edges 12 and 13 of the sealing frame 3 have further supply and connecting through bores 14 and 15, in edge 12, and through bores 16 and 17, in edge 13, which again form inlet and discharge channels for one or two further solute streams and lead to sealing frames which lie in the membrane stack unit offset by 90° or 270°, respectively, about the axis of the unit with respect to the illustrated sealing frame. They are then each connected with slits in the other frames corresponding to slits 4 and 5.

As can be seen in FIG. 1, each of the four side edges 1, 2, 12 and 13 are provided with bores arranged identically along the respective edges. Also, it can be seen that the through bores 10 alternate with the bores 8 and the through bores 11 alternate with the bores 9 with the relative positions of the through bores 10 and bores 8 being reversed relative to the positions of the through bores 11 and the bores 9. This assures that the bores in respective frames will all be aligned when the frames are rotated relative to each other by multiples of 90 degrees about the center axis of the unit.

All bores and slits 4, 5, 8-11 and 14-17 are sealed against, or isolated from, one another and against the interior of the chamber 6 and the external environment, as are the frames of deflector units (see FIG. 7), by members 18, 19 and 20 coated with a sealing material when membranes and end plates are combined into membrane stack units. Bores 21 and seals 22 at the corners of the sealing frame 3 serve to accommodate through-going holding elements, e.g. bolts.

Figure 2:
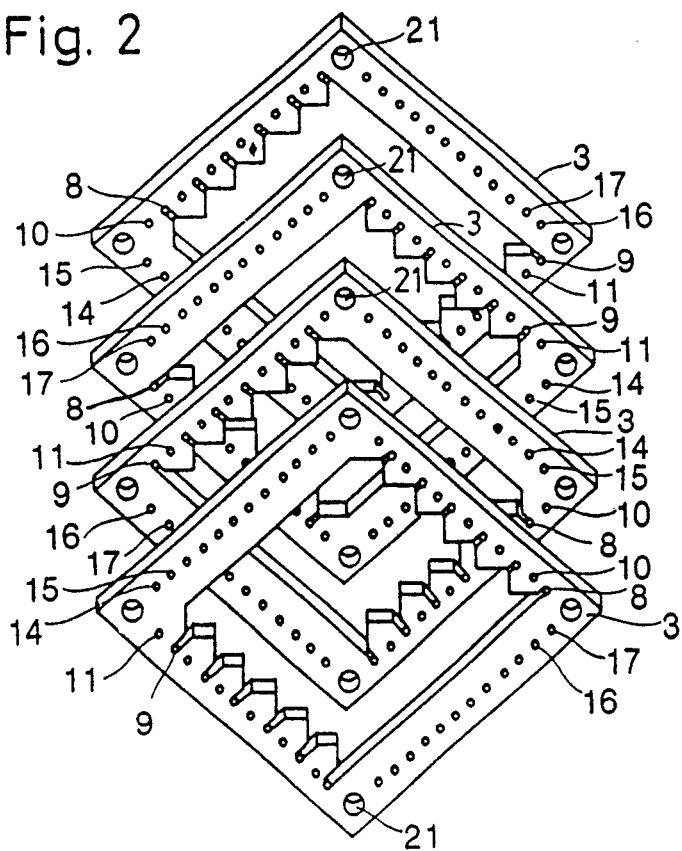
FIG. 2 is a perspective view illustrating the stacking of a plurality of the sealing frames of FIG. 1.

FIG. 2 shows the spatial relation among four sealing frames 3 and clearly illustrates the flow paths and the connection of the individual supply and connecting channels 8-11, 14-17 to the chambers, already described. Essentially, each sealing frame is rotated by 90° about the unit axis relative to the adjacent frame.

Figure 3:
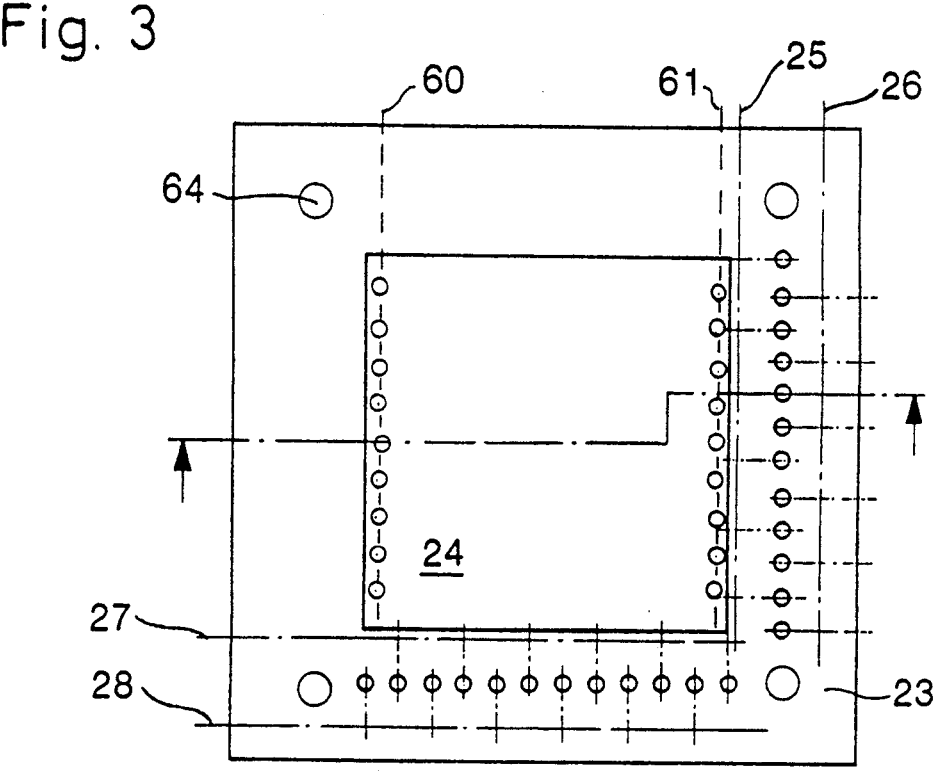
FIG. 3 is a top plan view of an end plate of the preferred embodiment of the invention.

FIG. 3 shows one of the two end plates 23 to be employed in a membrane stack. This plate is provided with a recess 24 which forms a chamber with a membrane mounted adjacent thereto in a stack unit. This chamber contains an electrode (not drawn in) to apply an electric field to the stack. In order to allow a flow of an electric current through the stack an electrode rinse solution has to be passed through the chamber. Therefore bores 60 and 61 and collecting channels 62 and 63 are provided for the entrance and discharge of the solution. The location of the ends of bores 60 and 61 connected to channels 62 and 63, respectively, are indicated by dash lines 60 and 61. The through-going bores 64 at the corners of the end plate serve to accomodate the holding elements to clamp the stack. They communicate with the bores 21 of the sealing frame. Bores 25-28 are likewise provided in two adjacent sides to correspond to bores 8-11, 14-17 in associated sealing frames.

Figure 5:
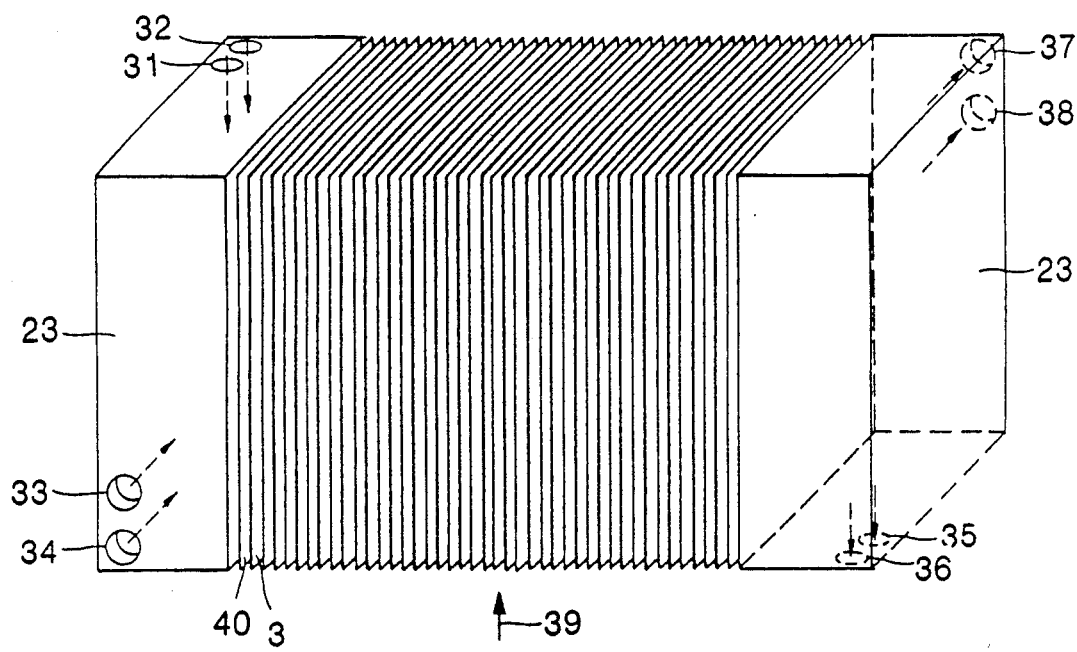
FIG. 5 is a perspective view of the stack unit.
Figure 4:
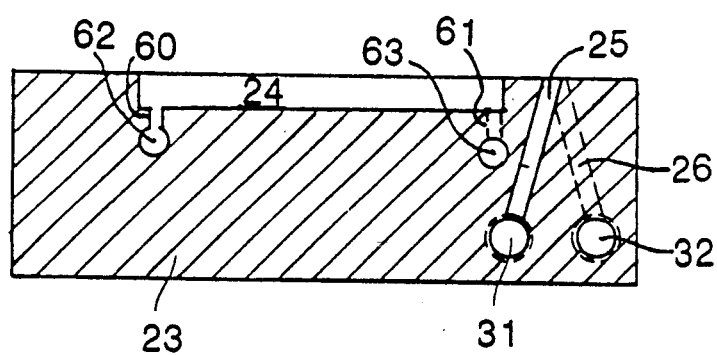
FIG. 4 is a cross-sectional elevational view of the end plate of FIG. 3.

Bores 25-28 are sloped, as shown in FIG. 4, and in communication with respective solute entrance and discharge collecting channels 31-38 of end plate 23 as shown in FIG. 5. These bores open at the surface of the membrane stack unit 39 or at the end plates 23. The locations of the ends of bores 25 and 26 connected to channels 31 and 32, respectively, are indicated by dot-dash lines 25 and 26 in FIG. 3. The corresponding locations of bores 27 and 28 in a side of end plate 23 at right angles to the side containing bores 25 and 26 are indicated by dot-dash lines 27 and 28. Bores 25 and 26 communicate with channels 31 and 32, respectively, while bores 27 and 28 cooperate with channels 33 and 34, respectively.

As shown in FIG. 5, the other end plate 23 is identical to the first-described one and contains channels 35, 36, 37 and 38 identical to channels 33, 34, 32 and 31, respectively. The membrane stack unit 39 is composed of a plurality of sealing frames 3 and membranes 40 stacked between end plates 23.

Figure 6:
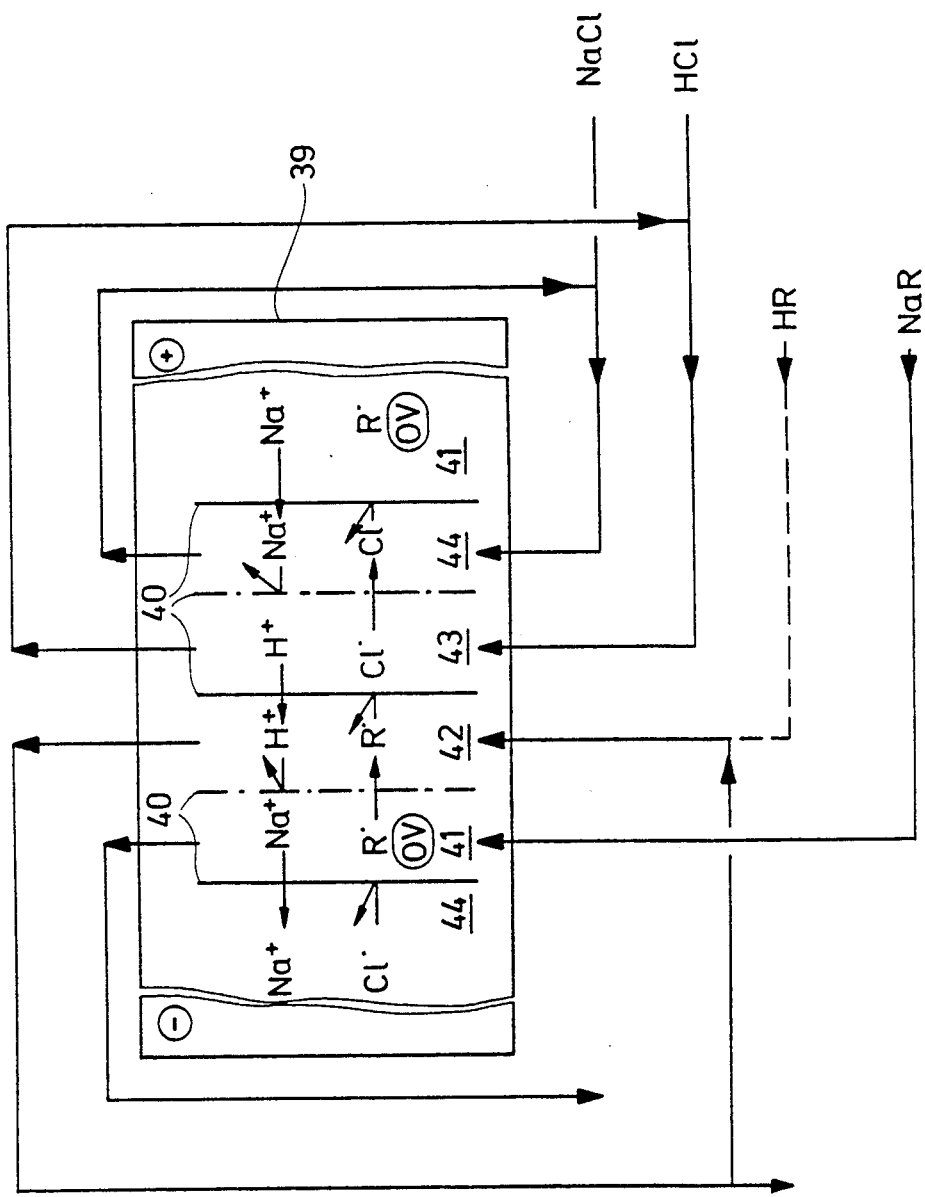
FIG. 6 is a schematic pictorial view of a fourchamber unit according to the invention.

FIG. 6 now shows an example for use of a membrane stack unit 39 with individual chambers 41-44 partitioned off by membranes 40, for the treatment of a chemical reaction mixture containing, in addition to the sodium salt of an organic acid (NaR), some nonionic impurities (OV), and which is to be relieved of those impurities, concentrated and converted to free acid. Such a four-circuit membrane stack includes at least three cation exchanger membranes and two anion exchanger membranes 40. Thus, a four-chamber unit is created.

Such units can be multiplied by simply placing one unit next to the other containing two cation and two anion exchange membrane per unit and connecting corresponding channels in parallel. In practice, membrane stacks including 10 to 100 parallel units can be used.

The following solutions are fed into the four circuits via intakes to chambers 41 to 44:
41—reaction mixture (contains NaR and nonionic organic impurities OV)
42—diluted organic acid
43—hydrochloric acid (HCl)
44—sodium chloride solution (NaCl)

After applying an electrical potential between the end plates, the following transporting processes develop in each of chambers 41 to 44:

41—the sodium ions (Na+) flow into the adjacent chamber 44 and the acid radical ions (R−) flow into the adjacent chamber 42. The solution is thus desalinated and contains only the nonionic organic impurities OV which are not transported by the electric field.

42—The R− ions from chamber 41 travel into this chamber as do the hydrogen ions (H+) from adjacent chamber 43. A pure organic acid (HR) results which can be concentrated further by partial recirculation to chamber 42.

43—The acid present in this chamber furnishes the H+ ions for the acid to be formed in adjacent chamber 42. The chloride ions (Cl−) in chamber 43 are transported to adjacent chamber 44.

44—Here a concentrated sodium chloride (NaCl) solution is formed from the Cl− ions from the adjacent chamber 43 and the Na+ ions from the adjacent chamber 41.

The concentration of the sodium chloride solution in chamber 44 should not exceed a certain value, e.g. about 20%. This is accomplished either by continuous addition of water—possibly the desalinated solution from chamber 41 can be used for this purpose—or by discontinuous exchange of the concentrated solution.

The result is a purified, concentrated organic acid, removed from chambers 42, and, as byproduct or waste products, a concentrated sodium chloride solution, removed from chambers 44, and a desalinated solution containing organic impurities, removed from chambers 41. A further possible use for a four-chamber unit is, for example, the processing of boiling solutions obtained in the manufacture of paper.

Figure 7:
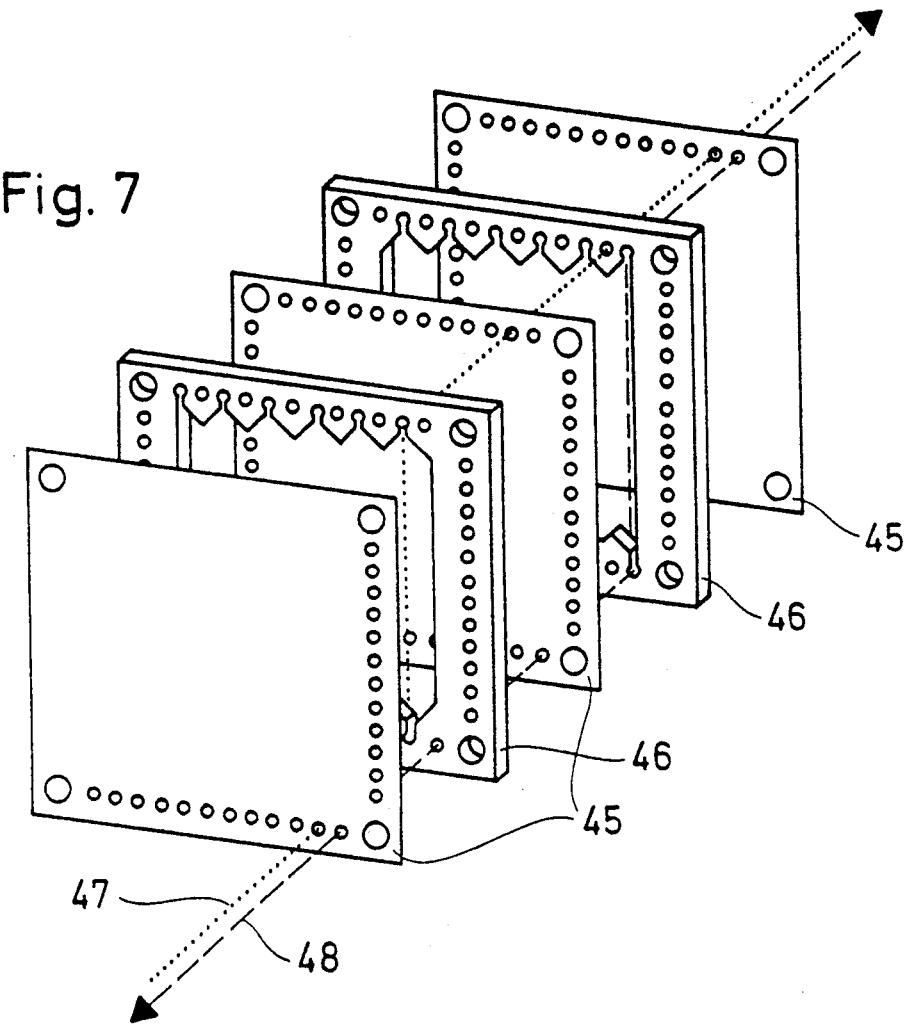
FIG. 7 is a perspective view of components of a deflection unit according to the invention, showing the paths of two solutions.

In order to internally deflect the solute streams in the membrane stack, the process path can be extended by means of deflector units, one of which is shown in FIG. 7, which are formed, for n solute streams, by n+1 impermeable plastic membranes or plates 45 and n deflection frames 46 arranged therebetween. FIG. 7 shows the paths 47 and 48 for two streams.

The deflection frames 46 are frames of the same geometric design as the sealing frames 3 but of a greater thickness and, for example for the case of a two-stream countercurrent arrangement, they are rotated with respect to one another by 180°. The deflection is controlled by the solution intake and discharge slits of the deflection frames 46 and the two outer membrane plates 45 of the deflection unit which are provided with through bores only at two adjacent side edges in the square. The outer plates 45 are rotated by 180° with respect to one another.

Figure 8:
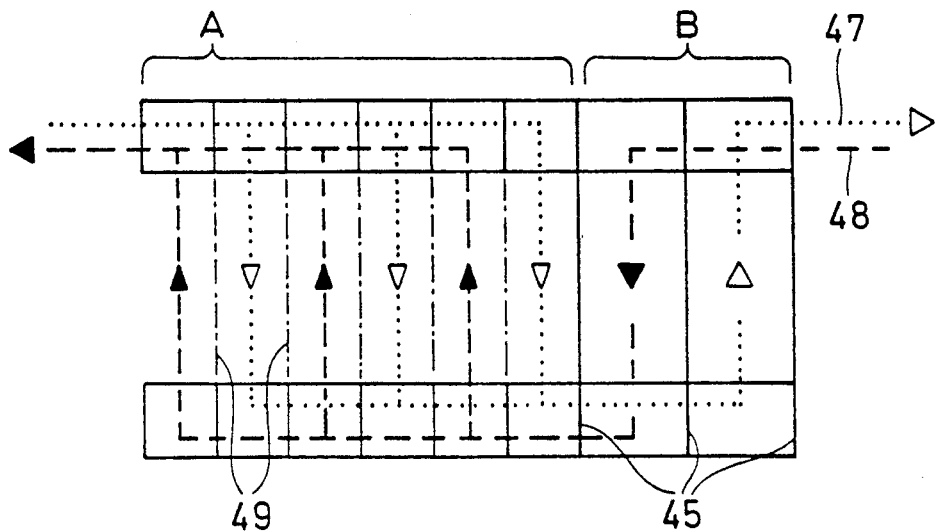
FIG. 8 is a pictorial schematic view of a deflection unit and a separating stag connected in a two-stream countercurrent arrangement.

FIG. 8 shows a separating stage A for the case of a two-stream countercurrent operation with permeable membranes 49 and an adjacent deflection unit B with impermeable membranes 45. The number of separating stages per stack is m+1 for m deflection units B and depends on the required process path. Two to 200 sealing frames 3 can be used per stage. In FIG. 8, successive sealing frames of unit A are rotated by 180° relative to one another.

Figure 9:
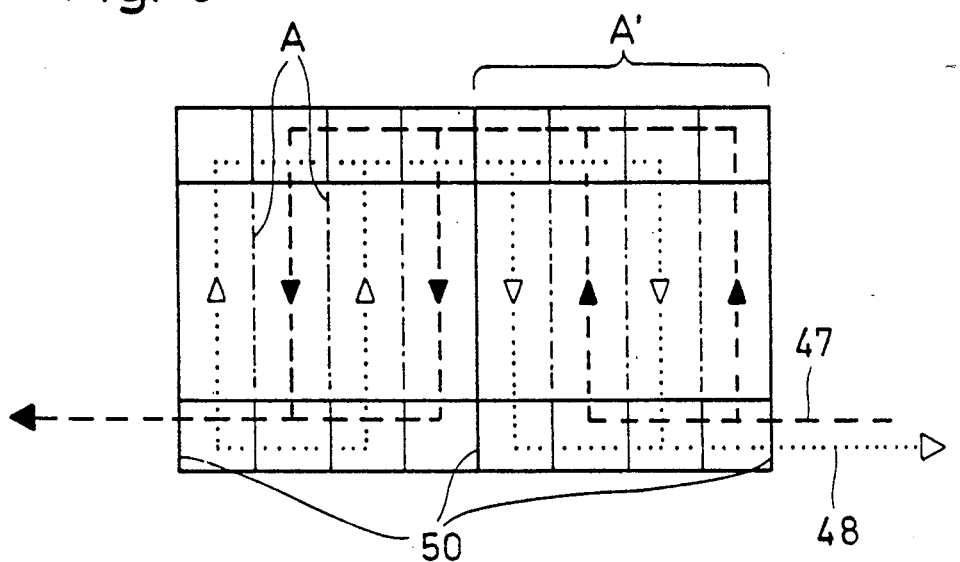
FIG. 9 is a view similar to that of FIG. 8 showing the internal deflection in the stack without a special deflection unit.

The internal deflection can be effected in an even simpler manner. In accordance with this direct deflection concept the transverse direction of flow of solute paths 47, 48 will be reversed in the chambers of two successive separating units A and A', as shown in FIG. 9. The deflection is realized by the use of an impermeable plastic membrane 50 disposed between separating stages A and A'. These membranes are merely provided with through bores at two adjacent sides of their square so as to be offset by 180° with respect to the next membrane.

A possibility also exists of using a permeable membrane instead of the impermeable membrane. This is the only way to obtain a stack which permits the electrical transfer of ions.

EXAMPLE FOR ELECTROMETATHESIS

The ion composition of cations or anions in a solution is to be changed without significantly influencing the total electrolyte content. This problem is solved in a three-stream design with a membrane stack and subsequent, repeated membrane arrangements:

For cation exchange the membrane sequence is A, K, K

For anion exchange the membrane sequence is K, A, A

K=cation exchange membrane (only for cations permeable)

A=anion exchange membrane (only for anions permeable)

Figure 10:
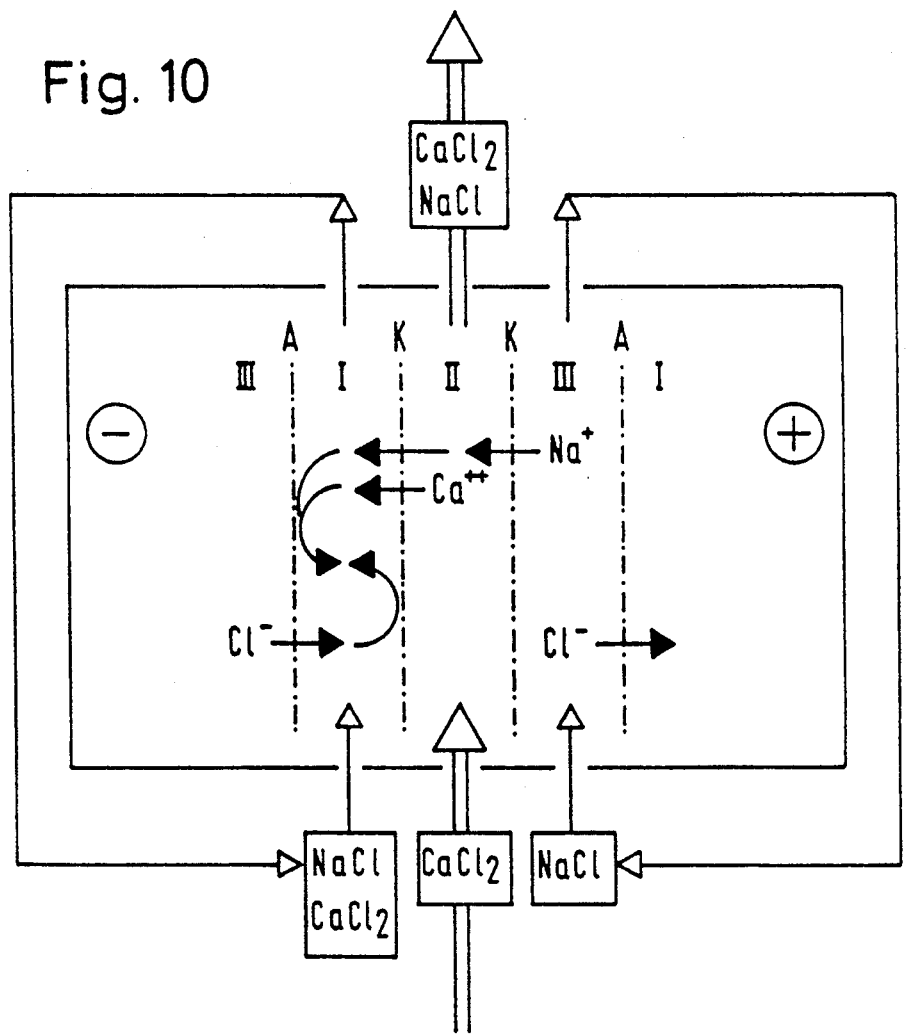
FIG. 10 is a view similar to that of FIG. 6 illustrating an example of electromethathesis.

FIG. 10 shows as an example the substitution of calcium in a calciumchloride solution by sodium. The following solutions are fed into the three circuits via intakes to chambers I, II and III:

I—diluted sodiumchloride solution (NaCl)

II—the calciumchloride solution (CaCl$_2$), whose calcium content is to be lowered III—concentrate sodiumchloride solution (NaCl)

When an electical potential is applied between the electrodes at the end plates, calcium ions whose concentration in chamber II is to be lowered are transported through the left cation exchange membrane to the adjacent diluted sodiumchloride solution in chamber I. To the same extent, sodium ions whose concentration in chamber II is to be increased are transported into this chamber from the adjacent concentrated sodiumchloride solution in chamber III through the right cation exchange membrane. At the same time an equivalent amount of chloride ions is transported through the anion exchange membrane A from chamber III to I. The solutions in chamber I and III, which are circulating through the stack, has to be replaced by discontinous exchange.

The result is a calciumchloride solution whose calcium content is lowered by sodium removed from chamber II, a desalinated sodiumchloride solution removed from chamber III and, as waste product a concentrated solution containing calciumchloride and sodiumchloride removed from chamber I.

EXAMPLE OF DIALYSIS

An acid, e.g. pickling acid or acid developed during the regeneration of cation exchangers, is to be purified without significantly diluting the acid, for which purpose a unit according to FIG. 8 or 9 can be employed.

The problem is solved with a two-stream arrangement of the membrane stack and a process path which may be lengthened by internal deflection of the solutions and with the use of dialysis membranes which permit the acid to pass and retain the salts.

DESCRIPTION OF THE DIALYSIS PROCESS

The contaminated acid, on the one hand, and water, on the other hand, are conducted in a counter current arrangement through the membrane stack. The acid here diffuses through the permeable membranes into the water and the product is an acid whose concentration is somewhat lower than that of the contaminated acid. An acid solution of the salt is also obtained.

With one type each of a sealing frame, an end plate and a deflecting frame it is possible to assemble membrane stacks which are able to perform separating and conversion tasks by means of electrodialysis, electrometathesis and dialysis which require two, three or four solute streams and wherein the direction of flow in the adjacent chambers is either in parallel and/or offset with respect to one another by 90° depending on the arrangement of the sealing frames and the number of solute streams.

By adding the described deflection concepts, the resulting membrane stacks have an extended process path which is particularly well suited for the dialysis process.

For the various processes there are standard or if necessary special grade ion exchange membranes and neutral membranes available. The possibility to clamp each type of membrane, which is provided with openings corresponding to the various bores in the sealing frames and end plates, between adjacent sealing frames allows to assamble membrane stacks with every suitable membrane sequence.

It will be understood that the above description of the present invention is susceptible to various modifications, changes and adaptations, and the same are intended to be comprehended within the meaning and range of equivalents of the appended claims.

What is claimed is:

1. A sealing frame for use in a membrane stack unit for performing a multichamber treatment of up to four component fluids, said sealing frame having a square shape and comprising four side edges enclosing a region constituting a treatment chamber, said four side edges including a first side edge, a second side edge opposing said first side edge, a third side edge and a fourth side edge opposing said third side edge, said first, second, third and fourth side edges being respectively provided with first, second, third and fourth sets of an equal number of bores, the positions of the bores relative to each other in each of said first, second, third and fourth sets being substantially the same, the positions of the bores of said second, third and fourth sets of bores relative to a center axis differing from those of respectively corresponding bores of said first set of bores only in being angularly spaced about said center axis from the respectively corresponding bores of said first set of bores by 90°, 180° and 270°, respectively, the bores of said first and second sets of bores consisting of a first subset of through bores along said first side edge for conducting fluid, a second subset of through bores along said second side edge for conducting fluid, a first subset of second bores along said first side edge and a second subset of second bores along said second side edge, the number of second bores in said first subset of second bores and the number of through bores in said second subset of through bores being equal, the number of second bores in said second subset of second bores and the number of through bores in said first subset of through bores being equal, the through bores of said first subset of through bores alternating with the second bores of said first subset of second bores, the through bores of said second subset of through bores alternating with the second bores of said second subset of second bores, the second subset of through bores and the second subset of second bores being angularly spaced about said center axis respectively from said first subset of second bores and said first subset of through bores by 180°, the bores of said third and fourth sets of bores respectively consisting of through bores for conducting fluid, said first and second side edges further having inlet and discharge channels each communicating with a respective one of the second bores of said first and second subsets of second bores and with said chamber, all of the through bores of said first, second, third and fourth sets of bores being isolated from said chamber, whereby when a plurality of sealing frames all substantially identical to said sealing frame are rotated by an integral multiple of 90° relative to an immediately adjacent one of the sealing frames about said center axis so that each bore in each sealing frame is aligned with a corresponding bore in each adjacent sealing frame, with membranes interposed between the sealing frames and each membrane being provided with openings aligned with all of the bores, with two end plates disposed at respective opposite ends of the stack unit with the sealing frames and the membranes interposed therebetween, with bores provided in the end plates to communicate with selected ones of the bores in the sealing frames, and with a plurality of fluid flow channels provided to communicate with the bores in each of the end plates, up to four separate flow paths through the stack unit are obtained.

2. A membrane stacking unit for performing a multichamber treatment of up to four component fluids, comprising:

a plurality of substantially identical sealing frames, each of said sealing frames having a square shape and being rotated by an integral of 90° about an axis of said stack relative to the immediately adjacent one of said sealing frames;

membranes interposed between said frames and each membrane; and two end plates disposed at respective opposite ends of the unit with said frames and membranes interposed therebetween;

each of said frames having four side edges enclosing a region constituting a treatment chamber, said four side edges including a first side edge, a second side edge opposing said first side edge, a third side edge and fourth side edge opposing said third side edge, said first, second, third and fourth side edges being respectively provided with first, second, third and fourth sets of an equal number of bores, the positions of the bores relative to each other in each of said first, second, third and fourth sets being substantially the same, the positions of the bores of said second, third and fourth sets of bores relative to a center axis differing from those of respectively corresponding bores of said first set of bores only in being angularly spaced about said center axis from the respectively corresponding bores of said first set of bores by 90°, 180° and 270°, respectively, the bores of said first and second sets of bores consisting of a first subset of through bores along said first side edge for conducting fluid, a second subset of through bores along said second side edge for conducting fluid, a first subset of second bores along said first side edge and a second subset of second bores along said second side edge, the number of second bores in said first subset of second bores and the number of through bores in said second subset of through bores being equal, the number of second bores in said second subset of second bores and the number of through bores in said first subset of through bores being equal, the through bores of said first subset of through bores alternating with the second bores of said first subset of second bores, the through bores of said second subset of through bores alternating with the second bores of said second subset of second bores, the second subset of through bores and the second subset of second bores being angularly spaced about said center axis respectively from said first subset of second bores and said first subset of through bores by 180°, the bores of said third and fourth sets of bores respectively consisting of through bores for conducting fluid, said first and second side edges further having inlet and discharge channels each communicating with a respective one of the second bores of said first and second subsets of second bores and with said chamber, all of the through bores of said first, second, third and fourth sets of bores being isolated from said chamber;

each said membrane being provided with openings aligned with all of said bores;

each of said end plates being provided with a plurality of bores communicating with selected ones of said bores in said sealing frames, and a plurality of fluid flow channels communicating with said bores in each of said end plates; and said bored in said sealing frames and said bores in said end plates together comprising up to four separate flow paths through said stack unit.

3. A membrane stack unit for performing a multichamber treatment of up to four component fluids, comprising:

a plurality of substantially identical sealing frames, each of said sealing frames having a square shape and being rotated by an integral multiple of 90° about the axis of said stack unit relative to the immediately adjacent one of said sealing frames; membranes interposed between said frames; and two end plates disposed at respective opposite ends of said unit with said frames and membranes interposed therebetween;

each of said frames having four side edges enclosing a region constituting a treatment chamber, said four side edges including a first and a second pair of opposed side edges, with said first pair of opposed side edges being provided with a set of through bores for conducting fluid, a set of second bores, and inlet and discharge channels each communicating with a respective one of said second bores and with said chamber, and said second pair of opposed side edges being provided with through bores for conducting fluid;

each said membrane being provided with openings aligned with all of said bores;

said sealing frames being oriented relative to one another such that in at least one pair of immediately adjacent sealing frames said through bores and second bores in said first pair of side edges of each one of the sealing frames of the pair of sealing frames communicate with through bores in said second pair of side edges of the other of the sealing frames of the pair of sealing frames;

each of said end plates being provided with a plurality of bores communicating with selected ones of said bores in said sealing frames, and a plurality of fluid flow channels communicating with said bores in each of said end plates; and said through bores, said second bores and said bores in said end plates together comprising a plurality of separate flow paths through said stack unit.

4. Membrane stack unit as defined in claim 3, further comprising a fluid deflector unit composed of deflection frames each having the same configuration as, but a greater thickness than, each of said sealing frames.

5. Membrane stack unit as defined in claim 3, wherein each of said sealing frames is provided with coatings of sealing material disposed for forming a fluid-tight seal between said bores and between each of said bores and the region surrounding said unit.

6. Membrane stack unit as defined in claim 3, wherein, along each of said side edges of said first pair of opposed side edges of each of said sealing frames, said through bores alternate with said second bores.

7. A membrane stack unit as defined in claim 6, wherein, along one side edge of said first pair of opposed side edges, each said second bore communicates with a respective inlet channel and, along the other side edge of said first pair of opposed side edges, each said second bore communicates with a respective discharge channel.

8. For use in a fluid flow control arrangement incorporating a stack of sealing frames, a square frame having four sides each provided with bores extending therethrough in a direction at right angles to the plane of the frame, said bores being arranged such that when the frame is rotated in its plane by 90°, 180° or 270°, the bores of each side will occupy positions that were, prior to rotation, occupied by bores of another side, said frame having a plurality of channel means provided in two opposite sides of the frame for establishing communication between the interior of the frame and selected bores of the two sides with all other bores of the frame being isolated from the interior of the frame, said selected bores being positioned such that when the frame is rotated in its plane by 180°, each bore associated with a channel means occupies a position that was, prior to rotation, occupied by a bore not associated with a channel means and each bore not associated with a channel means occupies a position that was, prior to rotation, occupied by a bore associated with a channel means, in consequence of which the frame, when used in conjunction with identical frames, may form fluid flow control arrangement providing a selected number of up to four independent flow paths.

9. A frame as defined in claim 8, wherein the bores of said two sides which have associated channel means alternate with bores without associated channel means.

* * * * *